(12) United States Patent
Gilbert

(10) Patent No.: US 8,444,155 B2
(45) Date of Patent: May 21, 2013

(54) SEALING RING FOR WHEELS

(75) Inventor: Peter Bradley Gilbert, Chatham (CA)

(73) Assignee: Ontario Inc., Chatham, Ontario (CA)

( * ) Notice: Subject to any disclaimer, the term of this patent is extended or adjusted under 35 U.S.C. 154(b) by 970 days.

(21) Appl. No.: 12/089,394

(22) PCT Filed: Oct. 19, 2006

(86) PCT No.: PCT/CA2006/001709
§ 371 (c)(1),
(2), (4) Date: Sep. 9, 2008

(87) PCT Pub. No.: WO2007/045086
PCT Pub. Date: Apr. 26, 2007

(65) Prior Publication Data
US 2009/0301626 A1    Dec. 10, 2009

Related U.S. Application Data

(60) Provisional application No. 60/728,335, filed on Oct. 20, 2005.

(51) Int. Cl.
*B60C 5/16* (2006.01)
*B29C 35/08* (2006.01)

(52) U.S. Cl.
USPC ............................ 277/637; 277/630; 152/513

(58) Field of Classification Search
USPC ....... 277/628, 630, 637, 644, 650; 152/379.4, 152/381.4–381.6, 383, 379.3, 379.5, 513, 152/399–401
See application file for complete search history.

(56) References Cited

U.S. PATENT DOCUMENTS

| | | | |
|---|---|---|---|
| 2,787,312 A | 4/1957 | Servaes | |
| 3,077,219 A | 2/1963 | Solomon | |
| 3,123,123 A | 3/1964 | Kampert | |
| 3,965,957 A * | 6/1976 | Nakasaki | 152/400 |
| 4,108,232 A | 8/1978 | Simpson | |
| 4,289,186 A | 9/1981 | Wilde | |
| 4,763,392 A | 8/1988 | Fogal et al. | |
| 5,820,709 A | 10/1998 | Matsuda | |
| 6,019,149 A | 2/2000 | Stringer | |
| 6,155,651 A * | 12/2000 | Mizata et al. | 301/95.104 |
| 6,589,470 B2 | 7/2003 | Fried et al. | |
| 7,104,300 B2 | 9/2006 | Veux et al. | |
| 2004/0095014 A1 | 5/2004 | Veux et al. | |

FOREIGN PATENT DOCUMENTS

FR      2847202 B1      5/2004

* cited by examiner

*Primary Examiner* — Gilbert Lee
(74) *Attorney, Agent, or Firm* — Perkins Coie LLP; Aaron Wininger

(57) ABSTRACT

The present invention is a system which improves the installation and provides a seal between tubeless tires and the rims of the wheels upon which they are mounted. A pliant sealing member or ring (10) is placed over the base (21) or rim of the wheel The ring has an opening to match the valve opening (27) of the rim. A special valve stem sleeve (15) may be provided to enhance the sealing of the valve stem. The invention features a stretch zone (19) which allows universal fit for a range of wheel sizes and also accommodates the drop center (24) of wheels. A method of casting the ring (10) is disclosed which includes the design of a mold (40) and the production of twin rings which are cut when completed to form two separate rings (10). The sealing ring (10) may be made of vinyl having a durometer rating of between 50-75 and a thickness of 0.5-1.0 mm.

10 Claims, 6 Drawing Sheets

SEALING RING FOR WHEELS

This application is a national phase entry under 35 U.S.C. §371 of PCT/CA06/01709 filed Oct. 19, 2006, which claims benefit of U.S. Patent Application No. 60/728,335 filed Oct. 20, 2005.

FIELD OF THE INVENTION

The present invention relates generally to system to enhance the installation and provide an effective seal between tires mounted on metal wheels or rims. More particularly, the present invention relates to a sealing ring for fitting to a wheel or rim prior to installation and inflation of a tire, and to methods of making sealing rings.

BACKGROUND OF THE INVENTION

Improperly maintained tires, including tire underinflation, lead to faster wear and increased fuel consumption. A recent study indicates that for each 5% of underinflation (approx 2 psi), translates into 1% of increased fuel consumption. Each litre of fuel consumption causes emission of 2.4 kg of $CO_2$ into the atmosphere. The estimated overall annual cost to Canada's light duty vehicle population due to tire underinflation is almost 643 million additional litres of fuel being consumed, resulting in an additional 1.54 megatonnes of $CO_2$ emission ("The Autosmart Fact Sheet Series": http://www.betiresmart.ca/pdf/TireCareMaintenance.pdf).

Tubeless tires are currently installed on most light duty vehicles. Generally, when a tubeless tire is installed on an aluminum or alloy wheel, the tire bead is intended to form a seal directly with the wheel to prevent air leakage from the tire. During normal wear, this seal may be disrupted if the wheel is damaged. Aside from physical damage to the wheel due to minor collisions, debris may become lodged between the wheel and the tire bead, compromising the integrity of the airtight seal. In addition, wheels are susceptible to oxidation, particularly in climates where salt is used on the road to mitigate slippery conditions caused by ice and snow. Oxidation of wheel surfaces compromises the seal and permit air to leak from the tire.

The prior art suggests many potential methods to prevent or repair wheel oxidation. For example, when a tire is replaced, the wheel may be polished where it contacts the tire bead to remove surface oxidation. In addition, the wheel may be painted or coated with liquid rubber. Such remedies are effective only for limited periods of time before oxidation again afflicts the wheel surface. Installation of a tube within the tire is generally not considered due to the potential for pinching or puncturing of the tube which may result in a rapid and hazardous loss of air from the tire.

The prior art describes various methods for preventing air leakage from a spoked tube-type wheel to permit a tubeless tire to be installed thereon. These methods include, for example, U.S. Pat. No. 4,108,232, which describes a natural or synthetic rubber shield that is fitted over a spoked tube-type wheel rim to prevent air leakage; and U.S. Pat. No. 6,019,149, which discloses a flat flexible strip for placement against a spoked tube-type wheel to seal the openings in the wheel so a tubeless tire can be installed thereon.

In addition, the prior art includes examples of methods to apply seals to vehicle wheels. For example, U.S. Pat. No. 4,763,392 to Fogal and Taber describes a method of manufacturing rust-proof, leak-proof and air-impervious tire rims. The wheel is cleaned, primed, and a layer of resilient copolymeric material is applied to all exposed surfaces of the wheel by dip-molding. When a tire is installed over the dip-molded wheel, the copolymeric material forms an airtight seal with the tire bead and the copolymeric material tightly adheres to the entire surface of the wheel.

U.S. Pat. No. 4,289,186 to Wilde describes a grooved wheel and a seal member for holding each tire bead under compression to prevent slipping. The seal member is applied to the tire prior to mounting on the wheel.

U.S. Pat. No. 3,956,957 to Nakasaki describes a flexible band for application to a wheel wherein the band includes ribs for engaging grooves in the wheel. Bead stoppers of rigid, lightweight material are anchored to the wheel by bolts, the bead stoppers for pressing the tire bead against the wheel flanges.

U.S. Pat. No. 3,077,219 to Solomon and U.S. Pat. No. 2,787,312 to Servaes each describe the application of two sealing rings for fitting over the wheel to prevent rusting or deformation of the wheel. U.S. Pat. No. 5,820,709 to Matsuda discloses elastic caps for placement over the wheel flanges to prevent leaks.

It is desirable to provide a sealing ring that is lightweight and inexpensive to manufacture, is easily shipped and installed upon a wheel, and provides airtight sealing with the tire bead even when the wheel surface is damaged without a tire bead/metal interface. In particular, there has been a need for an effective sealing ring that is dimensioned to fit over a number of wheels having different widths and that is readily installed on wheels.

SUMMARY OF THE INVENTION

In accordance with the invention, there is provided a sealing ring for installation against a wheel to provide a sealing surface with the tire bead of a tire when a tire is installed on the wheel over the sealing ring, the sealing ring comprising a resiliently flexible ring having a shape and size corresponding to the outer surfaces of the wheel exposed to air pressure when the tire is inflated over the wheel.

In one embodiment, the wheel has a base surface and the sealing ring has a corresponding sealing ring base surface having a stretch zone allowing the sealing ring to be installed on wheels of different widths. The stretch zone may be an upwardly projecting concave surface or an accordion surface.

In another embodiment, the wheel includes a valve stem hole and the sealing ring further comprises a valve stem sleeve at a position corresponding to the valve stem hole, the valve stem sleeve for protruding through the valve stem hole for sealing a valve stem from the wheel.

In one embodiment, the sealing ring includes a drop centre portion and a sloped ring within the drop centre portion for facilitating tire bead movement from the drop centre portion during tire installation.

In yet another embodiment, the sealing ring is solution cast over a mold having dimensions corresponding to the outer dimensions of a wheel.

In further embodiments, the minimum thickness of the sealing ring is 0.5 mm and the sloped ring has a thickness in the range of 1.5-2.0 mm. The sealing ring may also have corresponding radially projecting surfaces having a thickness in the range of 1-1.5 mm.

In another aspect of the invention, a method of manufacturing a flexible sealing ring for installation against a wheel is provided, comprising the steps of: exposing a ring-shaped mold to a curable polymer; curing the mold to set or solidify the polymer against the mold; and removing the set polymer from the mold to form at least one flexible sealing ring suitable for installation against a vehicle wheel.

In other embodiments of the method, the method further comprises the step of selectively heating one or more regions of the mold to facilitate the setting or solidification of a greater thickness of polymer adjacent selected regions of the mold. The step of removing the set polymer from the mold may also include cutting the set polymer at a location corresponding to the outside dimensions of the flexible sealing ring.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a flexible sealing ring 10 for placement over a wheel 20 to provide a sealing surface with a tire 30, and a method for producing and assembling the sealing ring on the wheel.

Figure 1:
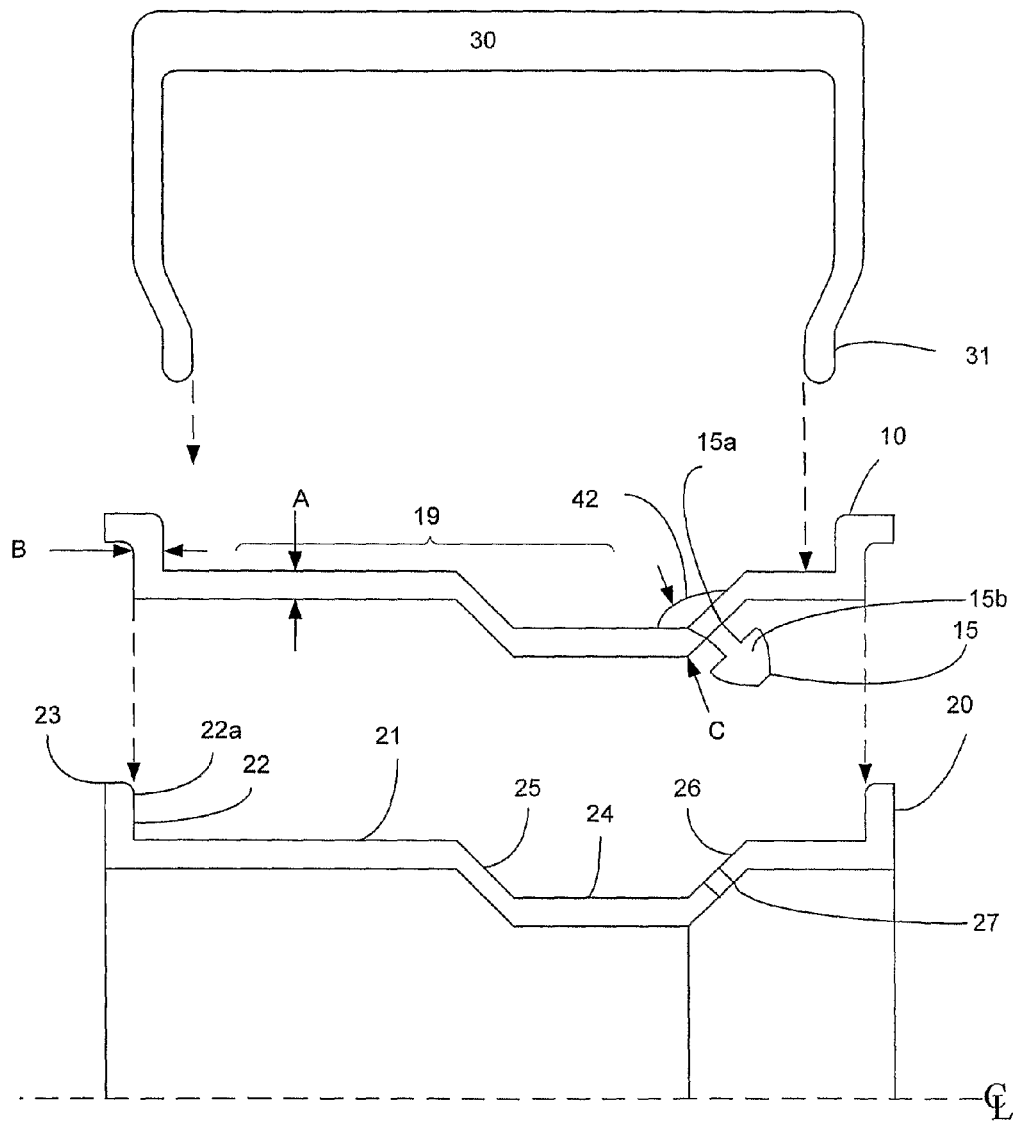
FIG. 1 is a schematic exploded view of sealing ring in accordance with the invention and a corresponding wheel and tire.
Figure 1A:
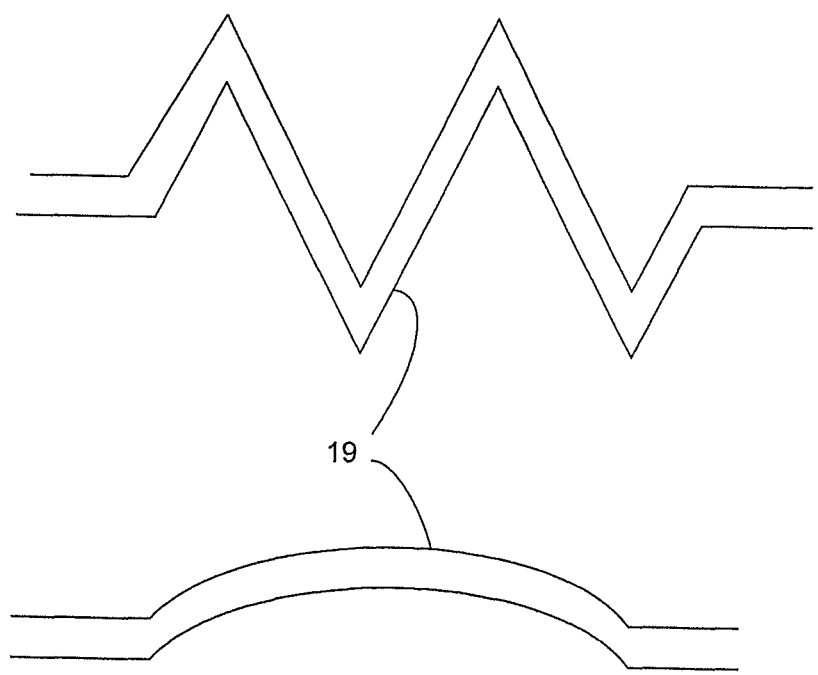
FIG. 1A shows examples of an accordion and a concave stretch zone embodiments of the sealing ring of the invention.
Figure 2:
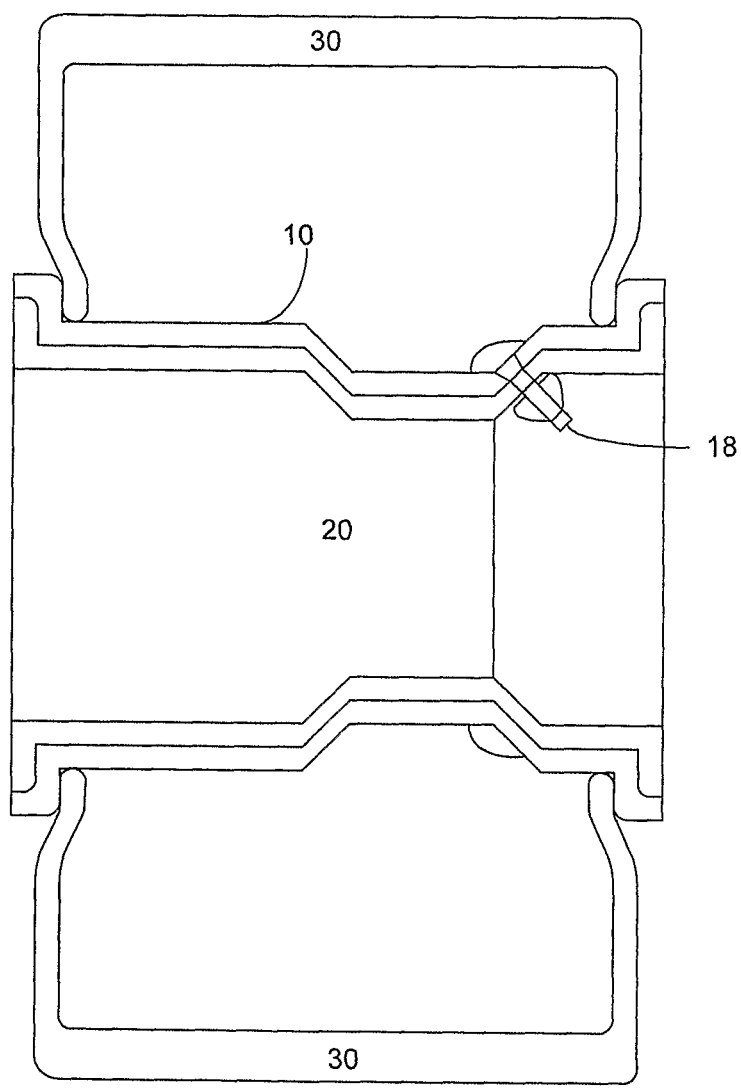
FIG. 2 is schematic cross-sectional view of a sealing ring in accordance with the invention installed on a wheel together with an installed tire.

As shown in FIGS. 1, 1A and 2 (not to scale), the sealing ring 10 is a ring preferably manufactured from a resiliently flexible material that is installed on the outer surfaces of a wheel 20. The ring is installed by stretching the sealing ring 10 over the wheel 20 to cover the inner surfaces of the wheel that will be exposed to air pressure once a tire 30 is installed and inflated on the wheel. FIG. 1 is an exploded diagram showing the ring 10, wheel 20 and tire 30 and FIG. 2 shows the assembled ring on a wheel with a tire. After installation and inflation of a tire, the tire bead 31 is forced against the ring to form an airtight seal between the sealing ring and tire.

The typical wheel (steel or aluminium) includes a base surface 21 and two radially projecting outer rings 22 having an outer surface 23. In many wheel designs, the wheel includes a drop centre 24 having tapered sides 25, 26. The drop centre is generally used to assist in the installation and inflation of a tire by providing a smaller diameter inner surface into which the tire bead is positioned during installation. The wheel will include a valve stem hole 27 usually located on tapered surface 26.

As is known, it is common that corrosion and damage may occur against surface 22a as a result of corrosive materials and/or grit working their way in between surface 22a and the tire 30. The effect of this corrosion and friction damage often leads to leakage as a result of the irregular sealing surface created by such damage.

The sealing ring in accordance with the invention is designed to effectively provide a continuous seal between the inside of the tire and the wheel by eliminating the tire bead-wheel interface. The sealing ring does not prevent damage to wheel surface 22a.

In a preferred embodiment, the sealing ring is provided with a "stretch-zone" 19 enabling the sealing ring to be installed on a greater range of widths of wheels. That is, by providing the sealing ring with additional material, preferably in the drop centre, one size ring can be installed on wheels of different widths. In one embodiment, the sealing ring is provided with an accordion profile or an upwardly projecting convex surface (FIG. 1A).

In addition, and in a preferred embodiment, the sealing ring is further provided with a valve stem sleeve 15 for insertion through the valve stem hole 27, in order to eliminate metal/valve stem contact when a valve stem 18 is installed. The valve stem sleeve includes inwardly tapering surfaces 15a and a hollow button 15b adapted to receive a valve stem when a valve stem is engaged with the sealing ring and the wheel.

In a still further embodiment, the sealing ring is provided with a sloped ring 42 of additional material designed to assist a tire bead in rising up the sloped surfaced of the sealing ring corresponding to the tapered surface 26 of the wheel during tire inflation without "dragging" the sealing ring with the tire bead. More specifically, the sloped ring 42 is designed to minimize the slope of the tapered surface.

Methods of Manufacture

The sealing ring may be manufactured by any appropriate methodology to provide a sealing ring having the desired dimensions to effectively separate the tire from the wheel without interfering substantially with the dimensions of the wheel and so affect tire installation and the balance of an installed tire.

Figure 3:
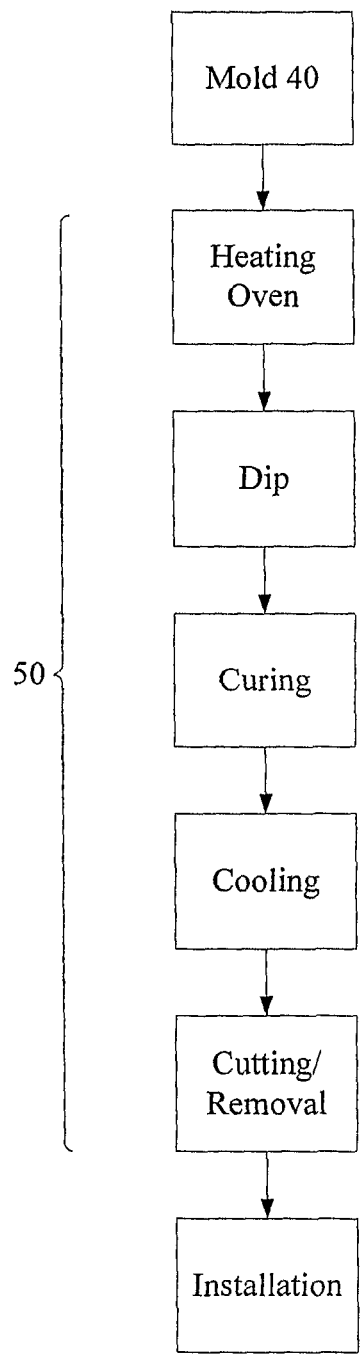
FIG. 3 is a flow chart depicting a method of manufacturing a sealing ring in accordance with an embodiment of the invention.
Figure 4:
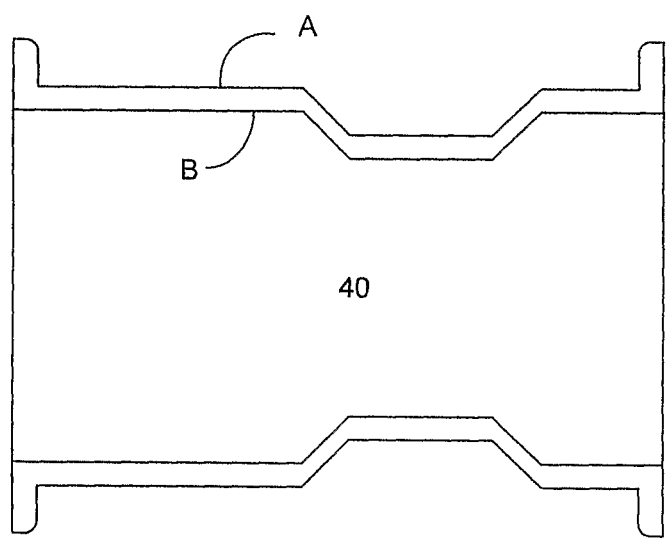
FIG. 4 is a schematic cross-sectional view of a mold for manufacturing a sealing ring in accordance with one embodiment of the invention; and, FIG. 5 is a schematic cross-sectional view of a mold for manufacturing a sealing ring in accordance with one embodiment of the invention with a sealing ring shown in dotted lines.

One method for producing a sealing ring 10 is described with reference to FIGS. 3-5. A mold 40 (preferably steel) is placed on a carousel (not shown) and is rotated or transferred through various stations during a production cycle 50. The mold 40 is first heated to approximately 400 degrees F., and is then exposed to liquid vinyl 41 at room temperature. The dipped mold is then cured in a second stage oven (set at approximately 400 degrees F.) to set the shape of the vinyl 41 against the mold 40.

The mold and vinyl are then cooled and the mold is transferred to a cutting/removal station to remove material dip coated to other areas of the mold. A primer or a release agent is preferably applied to the mold 40 prior to exposure to the liquid vinyl 41 to ensure that the sealing is not bonded to the mold and may be readily removed therefrom, for example by application of a pressurized air stream to the mold-sealing ring interface.

Figure 5:
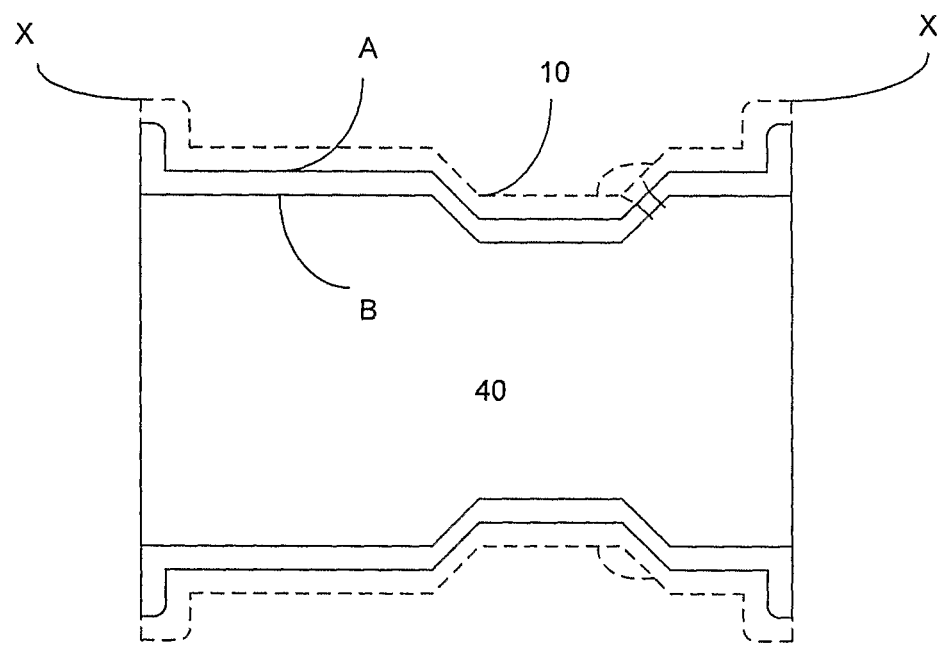

With the appropriate design of a molds two sealing rings having different diameters may be produced, against each of surfaces A and B as shown in FIG. 5 which would be physically separated by cutting.

Once the sealing ring(s) have been removed from the mold, the sealing rings may then be shipped or stored for later fitting to a wheel.

The sloped ring 42 may be formed by providing additional heating to a particular area of the mold in order to build up a greater thickness of cast material at a desired location. Additional heating may be provided by a heating ring on the inside or within the mold (not shown).

In a preferred embodiment, the sealing ring production cycle is completed in approximately 3 minutes when a steel mold is used with room temperature liquid vinyl. However, the mold material, sealing ring production parameters, and liquid vinyl may be substituted or altered by those skilled in the art to produce sealing rings that remain within the scope of the invention. Moreover, the sealing ring production cycle may be completed by manual or automated manipulation of the mold through the various steps mentioned above.

It is noted that the use of alternate mold materials may permit or necessitate alterations to the process described above, and as a result, a variety of sealing ring products may be produced in accordance with the invention. For example, the use of a mold material having an increased thermal conductivity (eg. aluminum) may result in more rapid setting of the liquid vinyl against the mold, thereby producing a vinyl sealing ring having reduced thickness as compared to that produced using a steel mold. Use of an aluminum mold may also permit reductions in the temperature required to heat the mold and to cure the liquid vinyl against the mold.

The mold may be designed to resemble a specific type of wheel, having grooves or ribs to exactly fit against the profile of that specific type of wheel. Alternatively, one mold may be used to produce sealing rings suitable for installation against a wide range of wheels having slightly different profiles, as the inherent flexibility of the vinyl sealing ring will generally permit installation against several different wheel profiles or wheel sizes.

Materials

The sealing ring product is preferably composed of vinyl having a durometer reading of between 50-75 A and a thickness from about 0.025-0.050 inches (approximately 0.5-1 mm). Other polymers as understood by those skilled in the art may be used.

The width of the sealing ring will be determined by the width of the wheel upon which the sealing ring is intended to be applied. Generally, the preferred width of the sealing ring is about 7.5 inches for installation against a standard 15×7.5 inch vehicle wheel. As noted above, a mold may be provided with appropriate contouring to provide a stretch zone allowing flexibility in installation for a range of wheel widths.

Although sealing rings having a wide range of thicknesses may be produced in accordance with the invention, an increased ring thickness may result in increased resistance to installation of a tire when installed on a wheel. This increased resistance will increase the tire bead setting pressure required to install the tire over the sealing ring. The sealing ring should therefore be manufactured within tolerances that permit a tire to be installed thereon without exceeding a tire manufacturer's recommended maximum tire bead setting pressure. The preferred range of vinyl sealing ring thickness in prototypes manufactured to date is between 20-50 thousandths of an inch (approximately 1-2 mm) for a standard 15×7.5 inch vehicle wheel (Dimension A in FIG. 1). It will be recognized by those skilled in the art that various wheel sizes or shapes may determine the preferable range of sealing ring thickness for a particular product use or application.

In a preferred embodiment, the thickness of the sealing ring abutting wheel surface 22a may be 1-1.5 mm (Dimension B in FIG. 1). Further still, the thickness of the sloped ring may be 1.5-2 mm (Dimension C in FIG. 1).

Installation

The sealing ring is installed onto a wheel by stretching of the sealing ring over the wheel. As noted above, a sealing ring of a given size may be installed onto various types of wheels due to the inherent flexibility and elasticity of the vinyl and/or the incorporation of a "stretch zone" 19. Once installed, the sealing ring is intended to fit snugly against the wheel, and a valve stem is inserted through the tire stem hole 27. In a preferred embodiment, the valve stem sleeve 15 is inserted through the tire stem hole. A tire may then be installed over the sealing ring and wheel in the usual manner.

When a sealing ring and tire are installed onto the wheel, the sealing ring forms a positive airtight seal with the tire bead without any metal/tire bead interface. It is preferred that the sealing ring is not bonded or specifically adhered to the wheel surface in order that the seal between the tire and the sealing ring remains intact despite any oxidation or damage that may occur to the wheel.

In use, it has been shown that the sealing rings in accordance with the invention prevent air leakage from the tire even when the wheel has experienced significant oxidation or physical damage.

OTHER EMBODIMENTS

In addition to the vinyl sealing rings described above, sealing rings composed of other formable, resilient materials may be also produced in accordance with the invention. Generally, it is preferred that the fabrication materials or compositions are suitable compositions for solution casting onto a mold, and that once set, the material remain flexible to facilitate installation over the wheel, and resilient to maintain an airtight seal with the tire bead.

The sealing rings of the present invention may be used for various types of wheels, including those of agricultural applications. For example, certain types of agricultural equipment require the use of tire tubes, which may be filled with calcium chloride or brine to decrease the potential for tire spin when driving in fields. As tire tubes are expensive, increase downtime, and increase the cost of repairing punctures, the sealing rings of the present invention may enable a tubeless tire to be filled with calcium chloride or brine and used for agricultural applications.

In addition, the sealing rings of the present invention may be particularly useful in small vehicles such as lawnmower tractors, which generally have thin and lightweight wheels that are prone to oxidation. Installation of a sealing ring on such wheels may reduce oxidation damage to the wheel and would provide an airtight seal to prevent air leakage from the tire even in the presence of wheel oxidation.

The above-described embodiments of the present invention are intended to be examples only. Alterations, modifications and variations may be effected to the particular embodiments by those of skill in the art without departing from the scope of the invention, which is defined by the claims appended hereto.

The invention claimed is:

1. A sealing ring for installation against a wheel to provide a sealing surface with the tire bead of a tire when a tire is installed on the wheel over the sealing ring, the sealing ring comprising a resiliently flexible ring having a shape and size corresponding to the outer surfaces of the rim exposed to air pressure when the tire is inflated over the wheel wherein the wheel has a base surface and the sealing ring has a corresponding sealing ring base surface having a stretch zone allowing the sealing ring to be installed on wheels of different widths wherein the stretch zone includes additional material extending circumferentially in a single annular structure around the circumference of the sealing ring.

2. A sealing ring as in claim 1 wherein the stretch zone is an upwardly projecting concave surface extending circumferentially around the circumference of the sealing ring in a single annular structure.

3. A sealing ring as in claim 1 wherein the stretch zone is an accordion surface extending circumferentially around the circumference of the sealing ring.

4. A sealing ring as in claim 1 wherein the wheel includes a valve stem hole and the sealing ring further comprises a valve stem sleeve at a position corresponding to the valve stem hole, the valve stem sleeve for protruding through the valve stem hole for sealing a valve stem from the wheel.

5. A sealing ring as in claim 1 wherein the sealing ring includes a drop centre portion and a sloped ring extending circumferentially around the perimeter of the sealing ring in a single annular structure within the drop centre portion for facilitating tire bead movement from the drop centre portion during tire installation.

6. A sealing ring as in claim 5 wherein the sloped ring has a thickness in the range of 1.5-2.0 mm.

7. A sealing ring as in claim 1 wherein the thickness of the sealing ring is 0.5-2.0 mm.

8. A sealing ring as in claim 1 wherein the wheel has two radially projecting surfaces at the outer edges of the wheel and wherein the sealing ring has corresponding radially projecting surfaces having a thickness in the range of 1-1.5 mm.

9. A sealing ring as in claim 1 wherein the sealing ring is vinyl having a durometer value of 50-75.

10. A sealing ring for installation against a wheel to provide a sealing surface with the tire bead of a tire when a tire is installed on the wheel over the sealing ring, the sealing ring comprising a resiliently flexible ring having a shape and size corresponding to the outer surfaces of the wheel exposed to air pressure when the tire is inflated over the wheel wherein the wheel has a base surface and the sealing ring has a corresponding sealing ring base surface having a stretch zone including additional material extending circumferentially around the circumference of the sealing ring in a single annular structure allowing the sealing ring to be installed on wheels of different widths and wherein the stretch zone is an upwardly projecting concave surface or an accordion surface and wherein the wheel includes a valve stem hole and the sealing ring further comprises a valve stem sleeve at a position corresponding to the valve stem hole, the valve stem sleeve for protruding through the valve stem hole for sealing a valve stem from the wheel.

* * * * *